US012710685B2

(12) United States Patent
Yedid et al.

(10) Patent No.: US 12,710,685 B2
(45) Date of Patent: Aug. 18, 2026

(54) ACTUATORS FOR PROVIDING AN EXTENDED TWO-DEGREE OF FREEDOM ROTATION RANGE

(71) Applicant: Corephotonics Ltd., Tel Aviv (IL)

(72) Inventors: Itay Yedid, Tel Aviv (IL); Ephraim Goldenberg, Tel Aviv (IL); Yiftah Kowal, Tel Aviv (IL); Daniel Boltinsky, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 19/442,382

(22) Filed: Jan. 7, 2026

(65) Prior Publication Data

US 2026/0133474 A1 May 14, 2026

Related U.S. Application Data

(63) Continuation of application No. 18/408,638, filed on Jan. 10, 2024, now Pat. No. 12,547,055, which is a continuation of application No. 17/776,427, filed as application No. PCT/IB2020/061333 on Dec. 1, 2020, now abandoned.

(60) Provisional application No. 62/942,913, filed on Dec. 3, 2019.

(51) Int. Cl.

| | |
|---|---|
| ***G03B 17/17*** | (2021.01) |
| ***G02B 7/18*** | (2021.01) |
| ***G02B 7/182*** | (2021.01) |
| ***G02B 13/00*** | (2006.01) |
| ***G02B 27/64*** | (2006.01) |
| ***G03B 30/00*** | (2021.01) |

(52) U.S. Cl.

CPC ........... *G03B 17/17* (2013.01); *G02B 7/1805* (2013.01); *G02B 7/1827* (2013.01); *G02B 13/0065* (2013.01); *G02B 27/646* (2013.01); *G03B 30/00* (2021.01)

(58) Field of Classification Search

CPC G02B 27/646; G02B 7/1828; G02B 13/0065; G02B 26/0816; G02B 7/1805; G03B 17/17; G03B 30/00

See application file for complete search history.

(56) References Cited

U.S. PATENT DOCUMENTS

2019/0049687 A1* 2/2019 Bachar ............... H02K 41/0354
2020/0404181 A1* 12/2020 Lee ....................... G03B 30/00

FOREIGN PATENT DOCUMENTS

WO WO-2019207464 A2 * 10/2019 ............ H04N 23/69

* cited by examiner

*Primary Examiner* — Cara E Rakowski

(74) *Attorney, Agent, or Firm* — Menachem Nathan; Nathan & Associates

(57) ABSTRACT

Actuators for providing an extended two-degree of freedom rotation range to an optical path folding element (OPFE) such as a prism or mirror in mobile devices such as smartphones, comprising a yaw sub-assembly having a yaw rotation axis, a pitch sub-assembly carrying the OPFE, the pitch sub-assembly including a pivot rotation mechanism and having a pitch rotation axis; and a stationary sub-assembly, wherein the actuator is operative to rotate the OPFE in two rotation directions, a first rotation for yaw around the yaw rotation axis and a second rotation for pitch around the pitch rotation axis, and wherein the rotation for pitch includes rotation using the pivot rotation mechanism.

19 Claims, 13 Drawing Sheets

ACTUATORS FOR PROVIDING AN EXTENDED TWO-DEGREE OF FREEDOM ROTATION RANGE

CROSS-REFERENCE TO RELATED APPLICATIONS

This application is a continuation from U.S. patent application Ser. No. 18/408,638 filed Jan. 10, 2024 (now allowed), which is a continuation application from U.S. patent application Ser. No. 17/776,427 filed May 12, 2022, which is a 371 application from international patent application PCT/IB2020/061333 filed Dec. 1, 2020, and is related to and claims priority from U.S. Provisional Patent Application No. 62/942,913 filed Dec. 3, 2019, which is expressly incorporated herein by reference in its entirety.

FIELD

The subject matter disclosed herein relates in general to digital cameras and in particular to actuators for yaw and pitch rotation in folded digital cameras included in smartphones.

BACKGROUND

Multi-cameras and folded cameras in electronic handheld devices (e.g. smartphones or tablets) are known. In a folded camera, a reflecting or optical path folding element (OPFE) such as a prism or a mirror and which includes a reflection surface, is added to tilt light propagation from a first optical path (e.g. perpendicular to the smart-phone back surface) to a second optical path (e.g. parallel to the smart-phone back surface).

Co-owned international patent application PCT/IB2019/053315 describes in detail folded cameras comprising an actuator for rotating an OPFE with two, first and second, degrees of freedom in an extended rotation range around two respective rotation axes, and dual-cameras including such a folded camera together with an upright camera.

There is need and it would be beneficial to have folded cameras in which an OPFE carrying module allows for a large extended rotation range around two respective rotation axes, for example for yaw and pitch rotations, supports state-of-the-art industry standards e.g. with respect to drop tests, and has cost low manufacturing compatible with smartphone costs.

SUMMARY

In various embodiments there are provided actuators for providing an extended two-degree of freedom rotation range to an OPFE (e.g. a prism or mirror) in mobile devices such as smartphones, comprising: a yaw sub-assembly having a yaw rotation axis; a pitch sub-assembly carrying the OPFE, the pitch sub-assembly including a pivot rotation mechanism and having a pitch rotation axis; and a stationary sub-assembly, wherein the actuator is operative to rotate the OPFE in two rotation directions, a first rotation for yaw around the yaw rotation axis and a second rotation for pitch around the pitch rotation axis, and wherein the rotation for pitch includes rotation using the pivot rotation mechanism.

In some embodiments, an actuator as above or below is integrated in a folded camera.

The folded camera may be a scanning Tele camera capable of scanning a scene in the two rotation directions.

In some embodiments, the yaw sub-assembly and the pitch sub-assembly form a master-slave arrangement, wherein the yaw sub-assembly acts as the master and the pitch sub-assembly acts as the slave.

In some embodiments, the pivot rotation mechanism includes a pivot located at two opposite sides of the OPFE and wherein the pitch rotation axis is close to a pitch sub-assembly center of gravity.

In some embodiments, the pivot rotation mechanism includes a ball-guided mechanism.

In some embodiments, the pivot rotation mechanism includes a pitch driving coil and a magnet.

In some embodiments, the pitch driving coil surrounds the yaw rotation axis.

In some embodiments, the yaw sub-assembly includes at least one groove-ball mechanism.

In some embodiments, grooves of the at least one groove-ball mechanism are concentrically curved, with a center of the curvature on the yaw rotation axis.

In some embodiments, balls of the at least one groove-ball mechanism are guided by groove pairs that include each a groove on the yaw sub-assembly and a groove on the stationary sub-assembly.

In some embodiments, the at least one groove-ball mechanism includes at least 3 balls.

In some embodiments, balls of the at least one groove-ball mechanism are located in a plane that is perpendicular to the yaw rotation axis.

In some embodiments, the yaw rotation is sensed by at least one Hall sensor.

In some embodiments, the least one Hall sensor is located beneath the yaw sub-assembly and is fixedly coupled to the stationary sub-assembly.

In some embodiments, the yaw rotation is by an actuation mechanism including a yaw driving coil and a yaw driving magnet.

In some embodiments, the yaw driving magnet is concentrically curved.

In some embodiments, the yaw driving magnet is curved, with a center of curvature close to the yaw rotation axis.

In some embodiments, the yaw driving magnet is fixedly coupled to the yaw sub-assembly and the driving coil is fixedly coupled to the housing.

In some embodiments, the yaw driving magnet has two different magnet polarization directions and wherein the two different polarization directions are perpendicular to the yaw rotation axis.

In some embodiments, the yaw rotation axis is close to a common center of mass of the yaw sub-assembly and the pitch sub-assembly together.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein and should not be considered limiting in any way. Like elements in different drawings may be indicated by like numerals. Elements in the drawings are not necessarily drawn to scale. In the drawings.

DETAILED DESCRIPTION

Figures 1A, 1B:
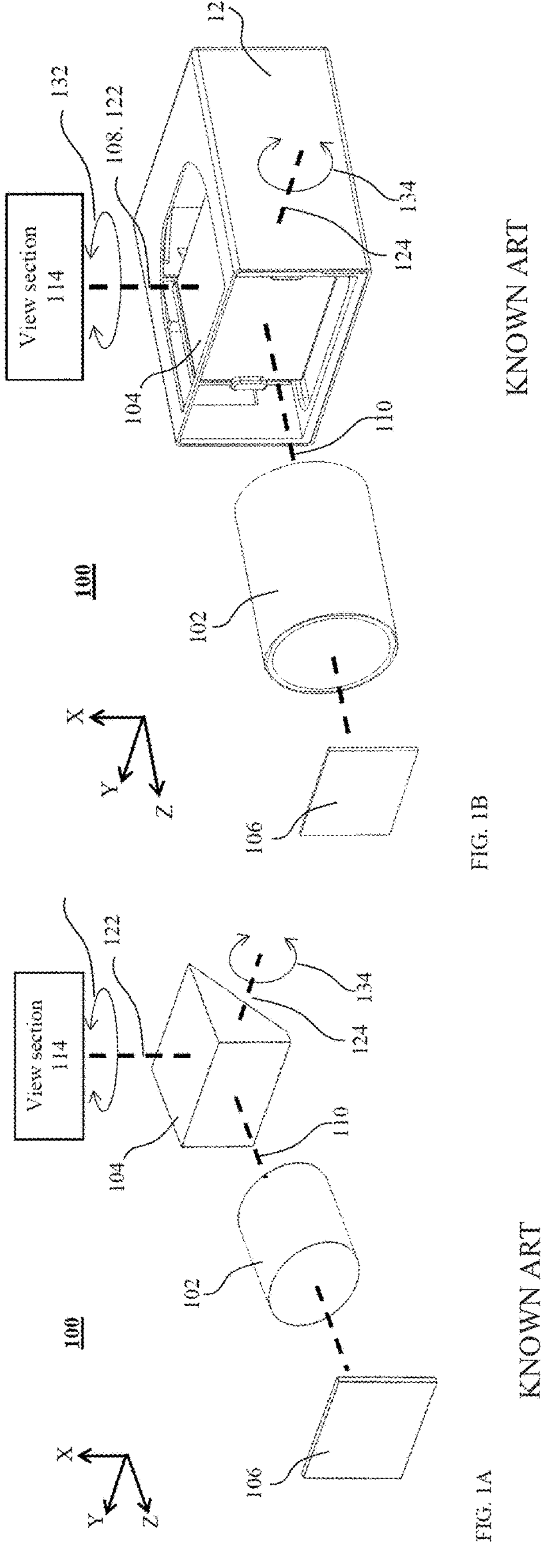
FIG. 1A illustrates a known folded camera with an optical path folding element (OPFE) with an extended 2 degrees-of-freedom (2DOF) rotation range.
FIG. 1B shows the folded camera of FIG. 1A with an OPFE actuator.

FIG. 1A illustrates a folded camera 100 with a 2 degrees-of-freedom (DOF) optical path folding element (OPFE) with an extended rotation range disclosed in PCT/IB2019/053315. The term "extended rotation range" describes a rotation range larger than the 2-3 degrees necessary for another application, for example optical image stabilization (OIS). The extended rotation range may be a range equal to or greater than ±5 degrees, ±10 degrees or even between 15-40 in each degree of freedom (DOF), relative to an OPFE zero (non-rotated) state.

Camera 100 includes a lens 102 with a lens optical axis, an OPFE 104 and an image sensor 106. OPFE 104 has a reflection surface and may be for example a mirror or a prism. OPFE 104 folds light from a first optical path 108 to a second optical path 110. First optical path 108 extends from the direction of a view section 114 (facing an object or scene) towards OPFE 104 and is substantially parallel to the X-axis (in the exemplary coordinate system). Second optical path 110 extends from OPFE 104 towards image sensor 106 and is substantially parallel to the Z-axis (in the exemplary coordinate system). Yaw rotation can be defined as rotation around an axis substantially parallel to the first optical path in the zero OPFE state. Pitch rotation can be defined as rotation around an axis substantially perpendicular to the yaw rotation axis and the lens optical axis.

The rotation of the OPFE can be done for example using OPFE actuator 120, seen in FIG. 1B. 2DOF rotation may be used to describe rotation of the prism around two axes (each axis being a DOF); in camera 100, the degrees of freedom are a yaw rotation 132 around yaw rotation axis 122 which is parallel to first optical path 108 (X-axis) when in zero state as defined above, and a pitch rotation 134 around a pitch rotation axis 124 which is parallel to the Y-axis.

Figure 1C:
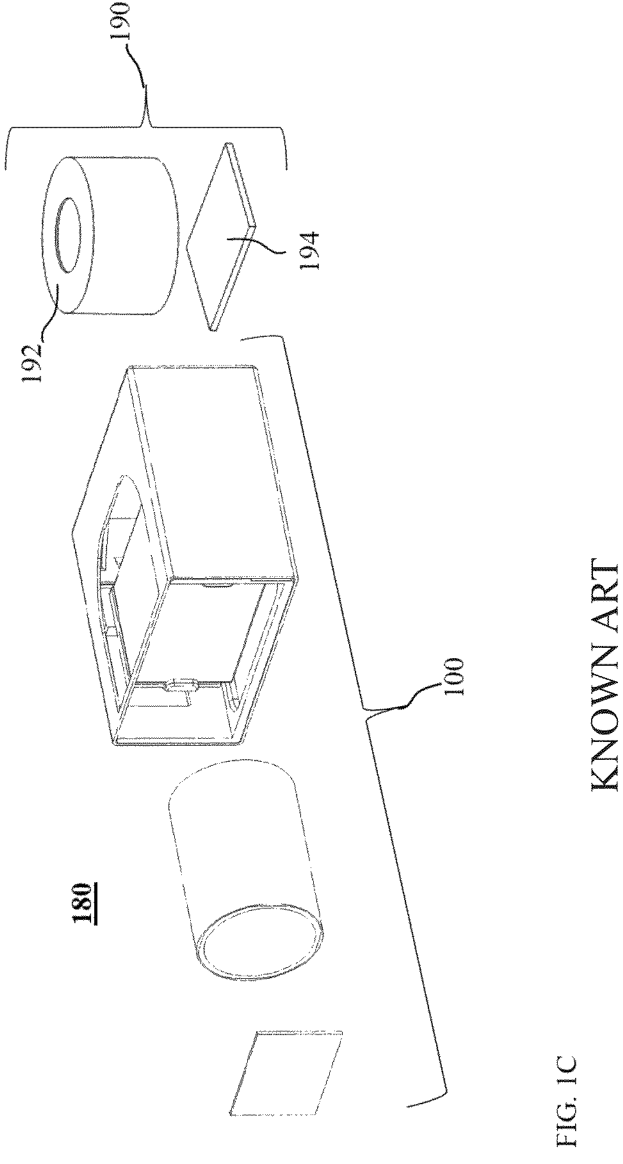
FIG. 1C shows the folded camera of FIG. 1A as part of a dual-camera system.

As shown in FIG. 1C, camera 100 may be a part of a dual-camera 180. Dual-camera 180 comprises camera 100 and an upright camera 190. Upright camera 190 includes a lens 192 and an image sensor 194. Cameras 100 and 190 may share some or all of respective fields of view (FOVs).

In the description below, directions are defined with reference to FIG. 1A. "Top" is the direction toward (facing) view section 114. "Bottom" is the opposite direction.

Figure 2A:
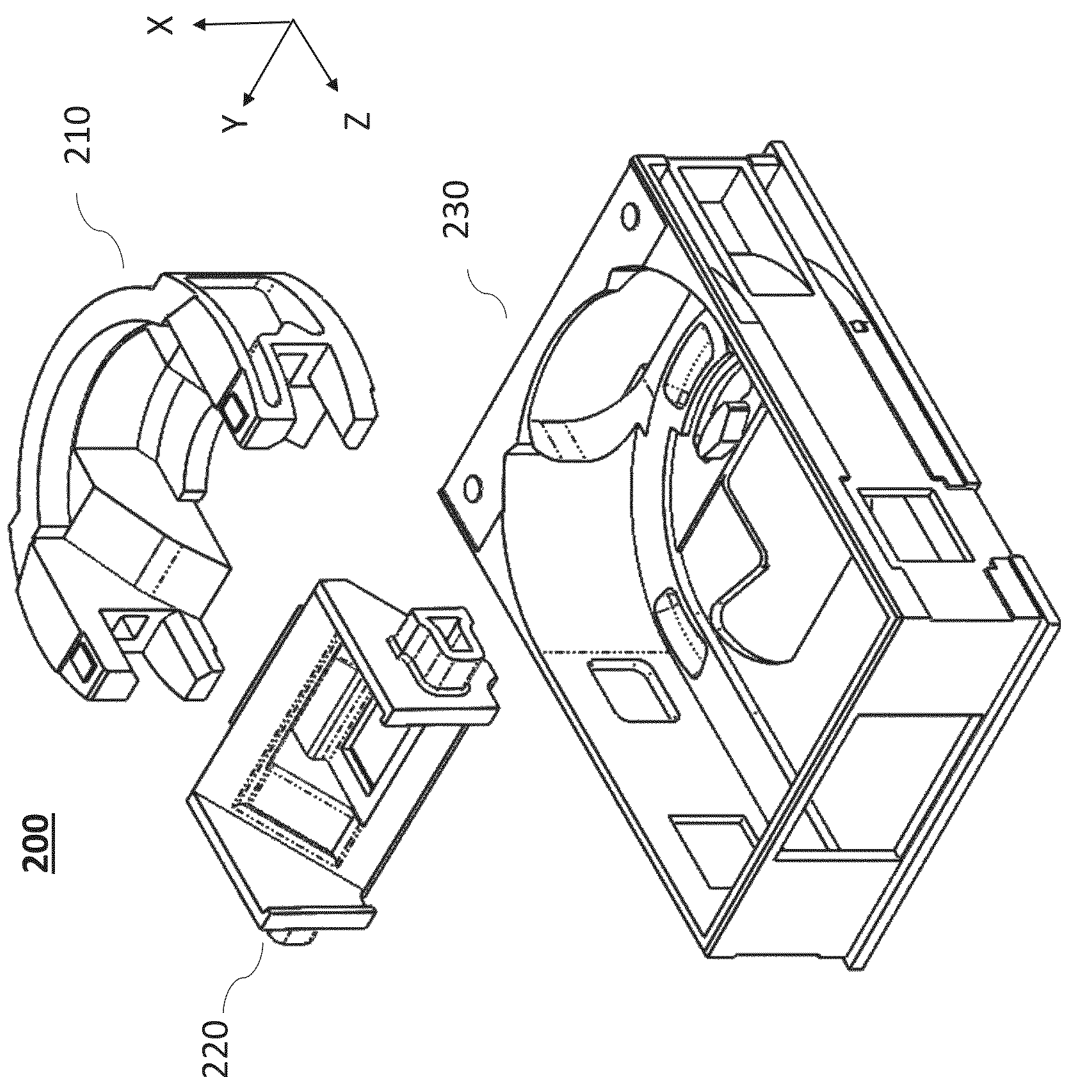
FIG. 2A shows an embodiment of an OPFE actuator disclosed herein in an exploded view.
Figure 2B:
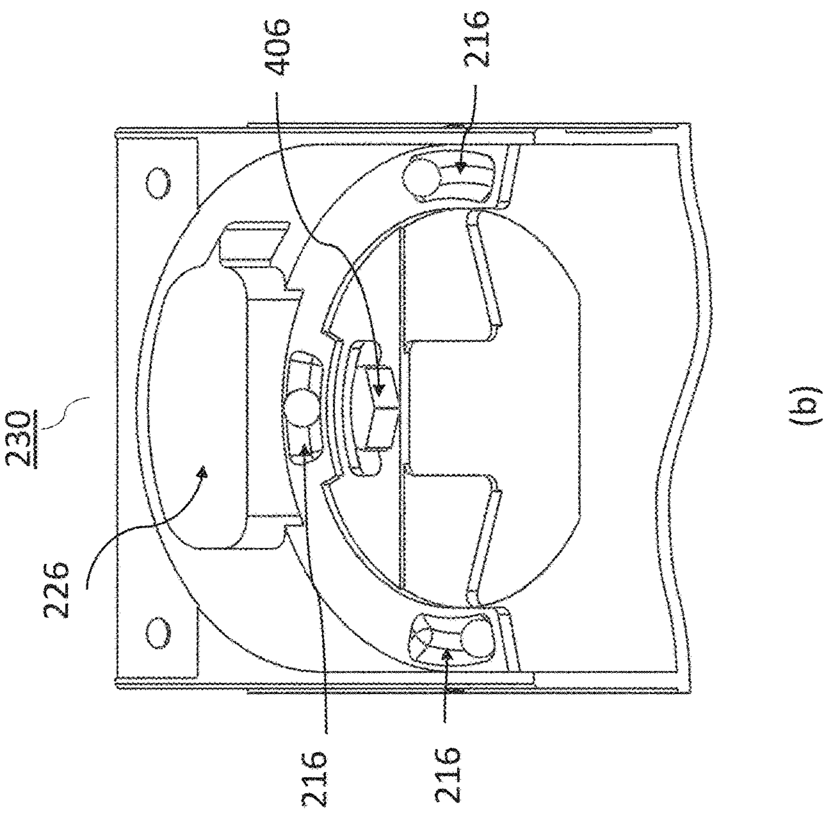
FIG. 2B shows details of the yaw, pitch and stationary sub-assemblies of the OPFE actuator of FIG. 2A.
Figure 2B:
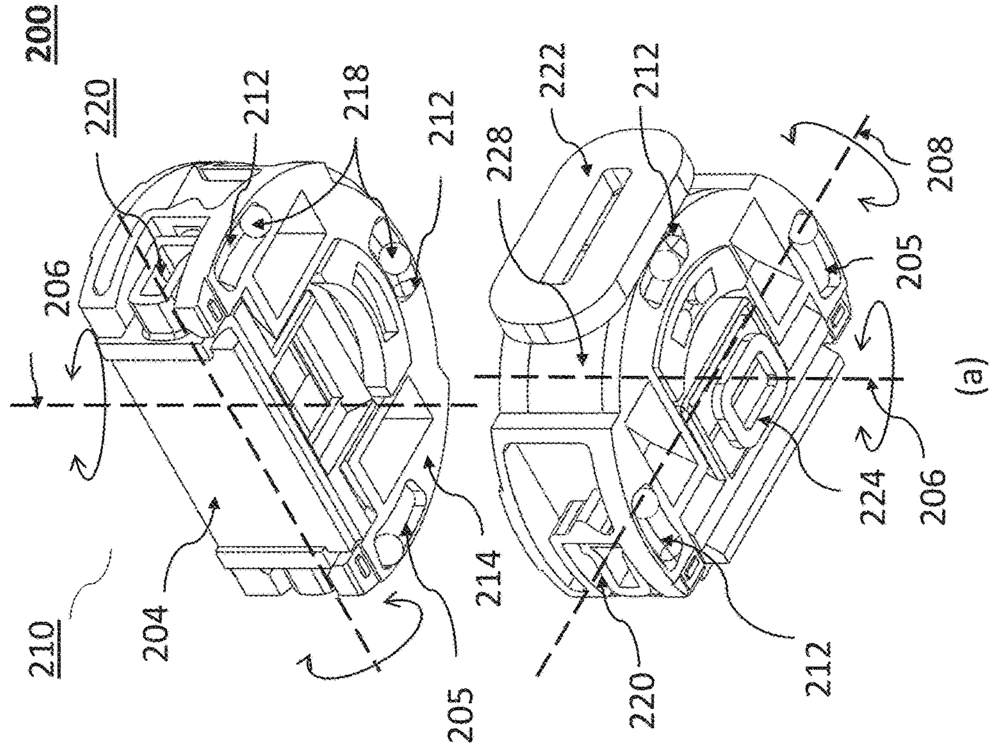

FIG. 2A shows an embodiment of an OPFE actuator 200 disclosed herein in an exploded view. Actuator 200 comprises a yaw sub-assembly 210, a pitch sub-assembly 220 and a stationary sub-assembly 230. FIG. 2B shows details of each sub-assembly. Yaw and pitch sub-assemblies 210 and 220 are shown in (a) in two different perspective views and stationary sub-assembly 230 is shown in (b) in a perspective view (45 degrees rotated around an axis 208 with respect to top view). Yaw sub-assembly 210 is included in stationary sub-assembly 230 and pitch sub-assembly 220 is included in yaw sub-assembly 220 in a master-slave arrangement. Yaw sub-assembly 210 is "dynamic" i.e. can be rotated around a yaw rotation axis 206 (e.g. parallel to the X-axis), while stationary sub-assembly 230 (as indicated by its name) is stationary i.e. not moving. Pitch sub-assembly 220 is rigidly coupled to an OPFE 204 and is rotatable around a pitch rotation axis 208 (e.g. parallel to the Y-axis) orthogonal to axis 206. When operable to be rotated, yaw sub-assembly 220 rotates OPFE 204 around axis 206 relative to stationary sub-assembly 230 and pitch sub-assembly 220 (and the OPFE attached thereto) rotates around axis 208 relative to the yaw sub-assembly and the stationary sub-assembly. In some embodiments, yaw rotation axis 206 may be close to a center of mass of yaw sub-assembly 210 and pitch sub-assembly 220 together. Close to a center of mass of yaw sub-assembly 210 and pitch sub-assembly 220 together may refer to a distance of e.g. less than 1.5 mm. In other examples, this may refer to a distance of e.g. less than 2 mm or less than 5 mm.

In yet other examples, close to a center of mass of pitch sub-assembly 220 may refer to a distance of e.g. less than 15% of the module height MH. In other examples, this may refer to a distance of e.g. less than 30% or less than 10% of the module height MH. MH is defined in FIG. 2E. The yaw rotation uses one flat surface curved rail 205 and two curved V-grooves 212 formed in a bottom surface 214 of yaw sub-assembly 210 below OPFE 204 (top view in FIG. 2(*a*)). Rail 205 and curved V-grooves 212 are coupled operationally to three V-grooves 216 and included in stationary sub-assembly 230. This setup of 205, 212 and 216 is known in the art as "tolerance compensation" or "tolerance release". Rail 205 and V-grooves 212 are concentrically curved, wherein the center of the curvature is rotation axis 206. The coupled rail and V-grooves form a groove-ball mechanism for yaw rotation of the OPFE.

In FIG. 2A, balls 218 are shown located within V-grooves 212 and flat surface curved rail 205. The balls may have an exemplary diameter greater than 1.2 mm, compared with 0.8 mm in a standard smartphone camera, allowing for improved drop immunity since their larger diameter provides a larger surface or contact area of balls in the rails and is less sensitive to drops.

OPFE actuator 200 further comprises a yaw driving coil 222 and one pitch driving coil 224, shown in the bottom view in FIG. 2(*a*). Pitch driving coil 224 surrounds yaw rotation axis 206. Yaw driving coil 222 is positioned in a hole 226 of (and is part of) stationary sub-assembly 230, i.e. is fixedly coupled to stationary sub-assembly 230.

Figure 2C:
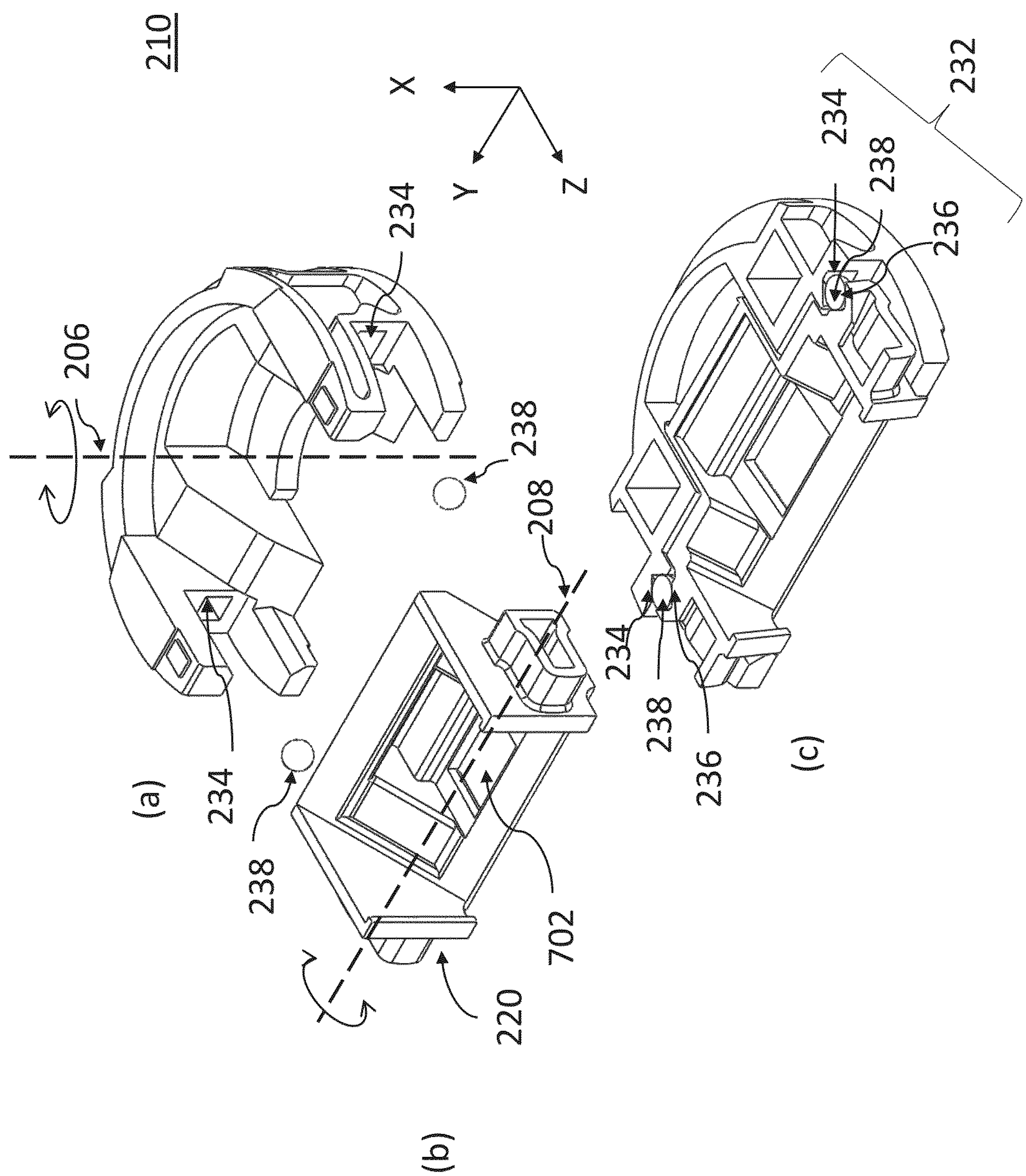
FIG. 2C shows an exploded view of the yaw and pitch sub-assemblies.

FIG. 2C shows an exploded view of the yaw and pitch sub-assemblies, with (a) showing yaw sub-assembly 210 without the pitch sub-assembly, (b) showing pitch sub-assembly 220 and (c) showing a cross section of yaw sub-assembly 210 in a YZ plane.

Figure 2D:
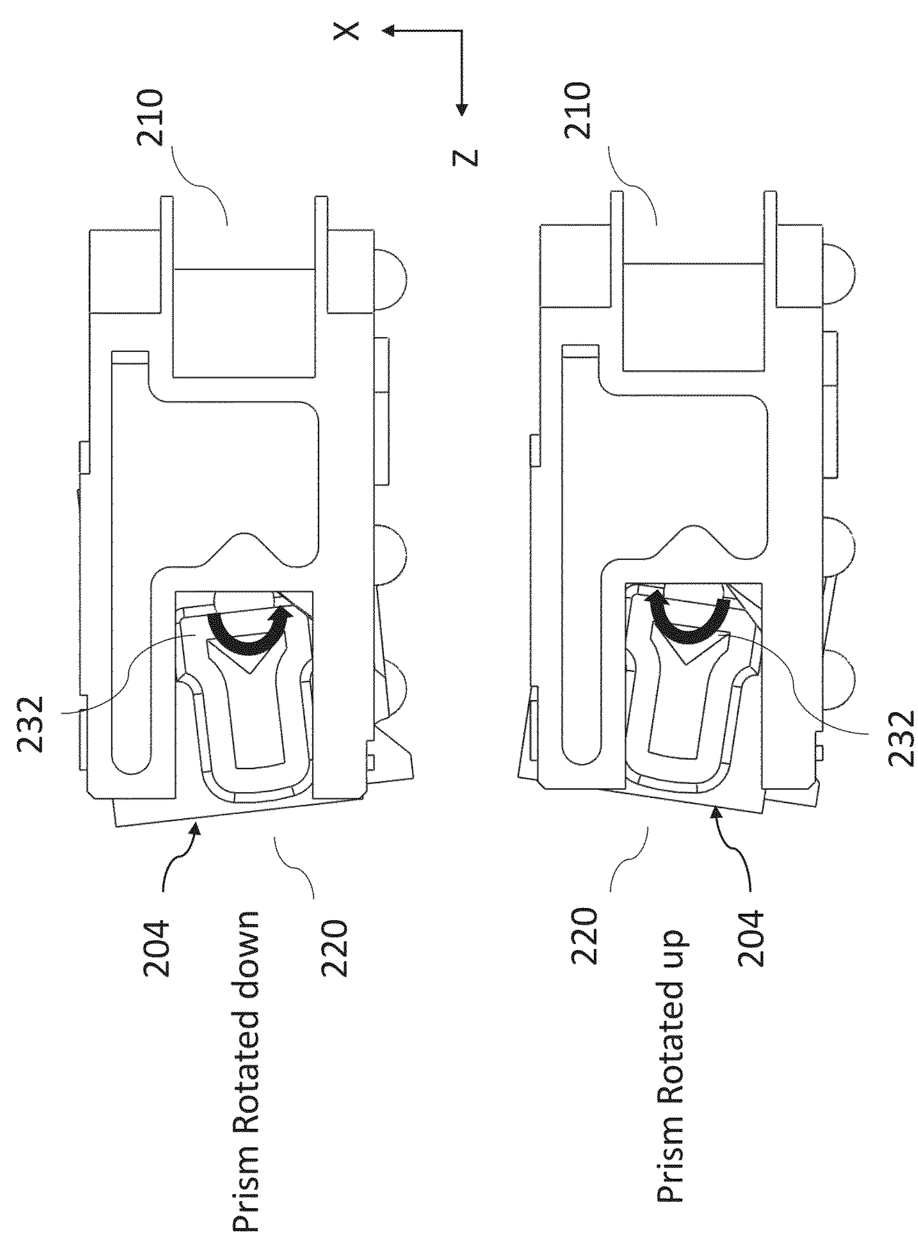
FIG. 2D shows the pitch sub-assembly and the OPFE in two rotated states.

FIG. 2D shows pitch sub-assembly 210 with OPFE 204 in two rotated states, rotated down and rotated up. The pitch rotation around axis 208 is enabled by a pivot rotation mechanism 232 that includes a pivot located at two sides of the OPFE, wherein the rotation axis is close to (and in some cases on) a pitch sub-assembly center of mass. Close to a pitch sub-assembly center of mass may refer to a distance of e.g. less than 1 mm. In other examples, this may refer to a distance of e.g. less than 2 mm or less than 4 mm.

In yet other examples, close to a center of mass of pitch sub-assembly 220 may refer to a distance of e.g. less than 10% of the module height MH. In other examples, this may refer to a distance of e.g. less than 30% or less than 7.5% of the module height MH.

Pivot rotation mechanism 232 is formed by sockets 234 in yaw sub-assembly 210, sockets 236 in pitch sub-assembly 220 and balls 238 fixed in sockets 234 and 236. Like balls 218, balls 238 have an exemplary diameter larger than 1.2 mm, allowing for improved drop immunity since their larger diameter provides a larger surface or contact area and is less sensitive to drops.

Pitch rotation using a pivot ball-guide mechanism contrasts with the rail-based pitch movement in PCT/IB2019/053315. The pivot ball based design disclosed herein is advantageous as of its small size and allows robust manufacturing of the pivot rotation mechanism.

Figure 2E:
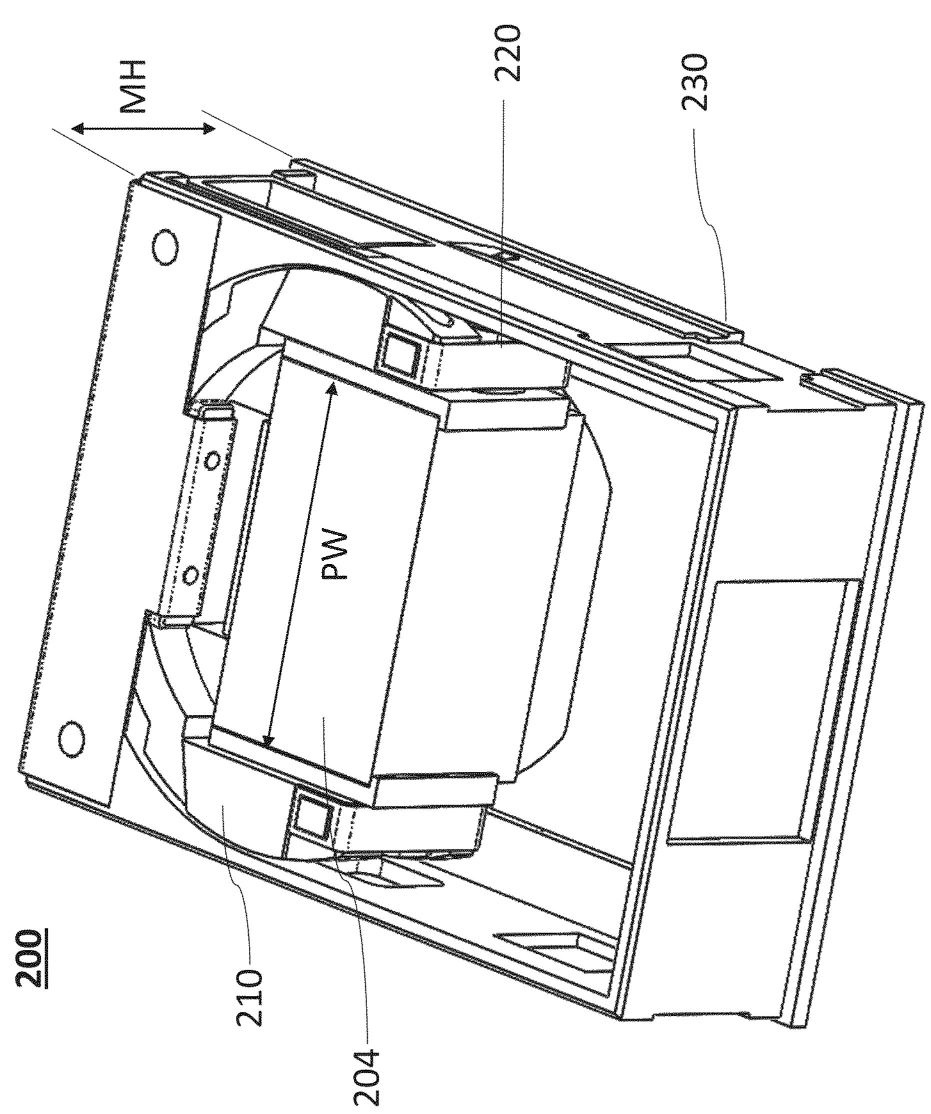
FIG. 2E shows an embodiment of an OPFE actuator disclosed herein in a perspective view.

FIG. 2E shows an embodiment of an OPFE actuator 200 disclosed herein in a perspective view. Actuator 200 comprises a yaw sub-assembly 210, a pitch sub-assembly 220 carrying OPFE 204 and a stationary sub-assembly 230. A module height ("MH") may be 6.0-8.5 mm. A prism width ("PW") may be 60 mm-140 mm.

Figure 3:
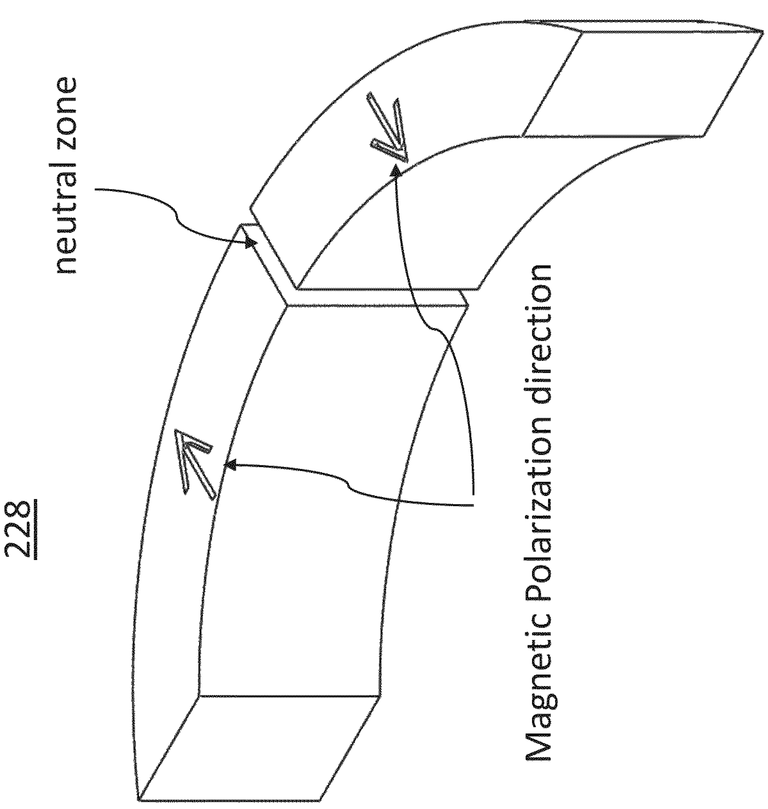
FIG. 3 shows a yaw driving magnet of the OPFE actuator.

OPFE actuator 200 further comprises a yaw driving magnet 228 (FIG. 3) for driving the yaw rotation. Exemplarily and as shown in FIG. 3, yaw driving magnet 228 may be a 4-pole single magnet. In contrast, in PCT/IB2019/053315, the yaw driving magnet has only two poles. The arrows show the magnetic polarization direction. The design disclosed herein is advantageous in that it provides a higher magnetic field leading to a higher actuation force.

Figure 4:
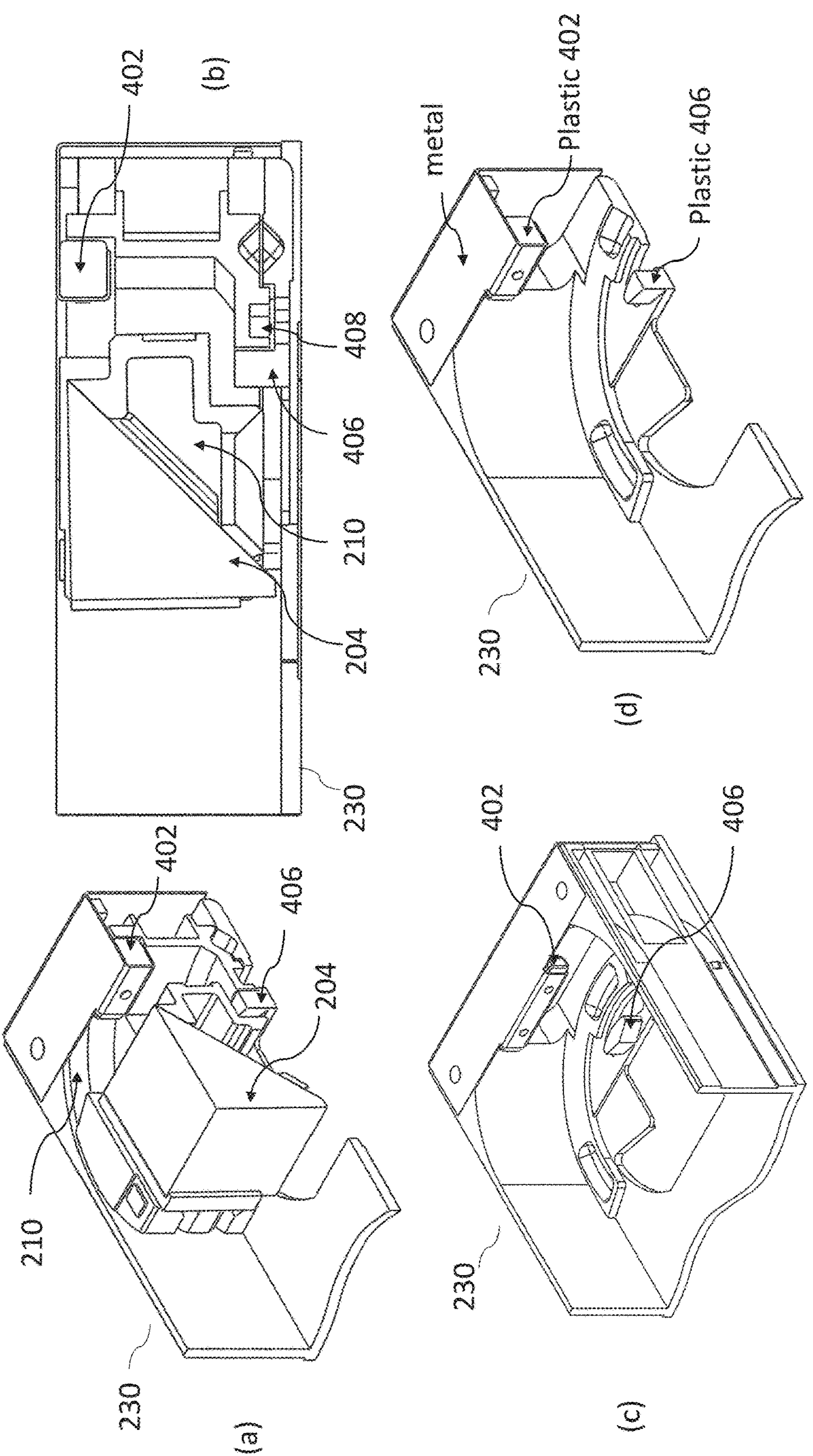
FIG. 4 shows various views with more details of parts of a yaw sub-assembly and a stationary sub-assembly of the OPFE actuator.

FIG. 4 shows various views with more details of parts of yaw sub-assembly 210 and stationary sub-assembly 230. Views (a) and (b) show cross sections through OPFE actuator 200, and views (c) and (d) show cross sections through stationary sub-assembly 230. As mentioned, yaw sub-assembly 210 is carried by stationary sub-assembly 230. OPFE actuator 200 further comprises a yaw stopping mechanism divided into a drop stopping mechanism and a rotation stopping mechanism. The drop stopping mechanism includes a drop stopper 402 that prevents yaw sub-assembly 210 from falling out of stationary sub-assembly 230 in case the OPFE actuator (or a device such as smartphone that includes the camera and actuator) is dropped. Exemplarily, stopper 402 may be made of plastic, while a part of stationary sub-assembly 230 in contact with stopper 402 may be made of metal. The rotation stopping mechanism includes a rotation stopper 406 that limits the rotation range of yaw sub-assembly 210. Exemplarily, rotation stopper 406 may be made of plastic, while a part of stationary sub-assembly 230 in contact with stopper 406 may be made of metal. In contrast, in PCT/IB2019/053315 there is only one metal stopper that performs all functions. The design disclosed herein is advantageous in that there are no plastic parts that may hit a metal if a device such as smartphone that includes the camera and actuator is dropped, or because of any other event that may create undesirable particles.

Yaw Rotation Position Sensing

Figure 5:
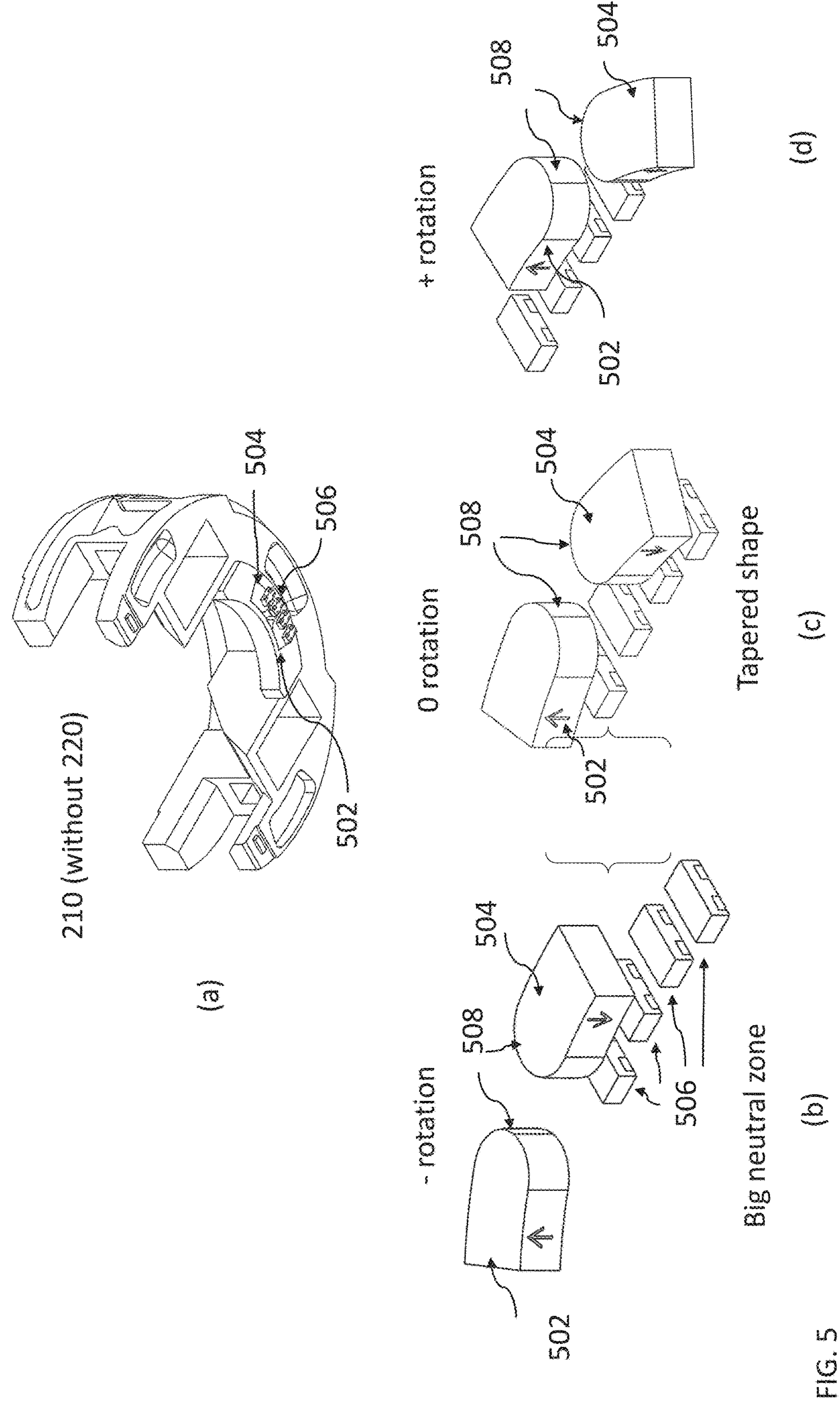
FIG. 5 shows in (a) yaw sub-assembly without the pitch sub-assembly and in (b), (c) and (d) details of yaw sensing magnets.

FIG. 5 shows in (a) yaw sub-assembly 210 without pitch sub-assembly 220 and in (b), (c) and (d) details of yaw sensing magnets 502 and 504 used for sensing yaw rotation position at 3 different yaw rotation positions. View (b) is at a negative rotation position, view (c) is at a zero rotation position and view (d) is at a positive rotation position. Magnets 502 and 504 are fixedly coupled to yaw sub-assembly 210 and are flat, in contrast with magnets used for the same purpose in PCT/IB2019/053315, which are not flat. Flat magnets may be beneficial from a manufacturing or cost point of view. Flat yaw sensing magnets 502 and 504 have a tapered shape 508 to enable sensing with large movements. In some embodiments, only one yaw sensing magnet may be used.

The yaw sensing magnets may be combined with Hall effect bar sensors (or "Hall bars") 506 for rotation position sensing. Hall bar sensors 506 are fixedly coupled to stationary sub-assembly 230 and are placed beneath yaw sub-assembly 210 as shown in (d). In comparison to PCT/IB2019/053315, where the curved driving magnet was also sensing magnet, the driving mechanism and the sensing mechanism are separated here, allowing for a more precise sensing with lesser parts. The separation driving mechanism and the sensing mechanism allows for a large rotation radius (i.e. lever) for the driving force and a small rotation radius for sensing the rotation with higher precision.

Yaw sub-assembly embodiments disclosed herein may support a yaw rotation range of e.g. ±10 to ±35 degrees.

Pitch Rotation Position Sensing

Figure 6:
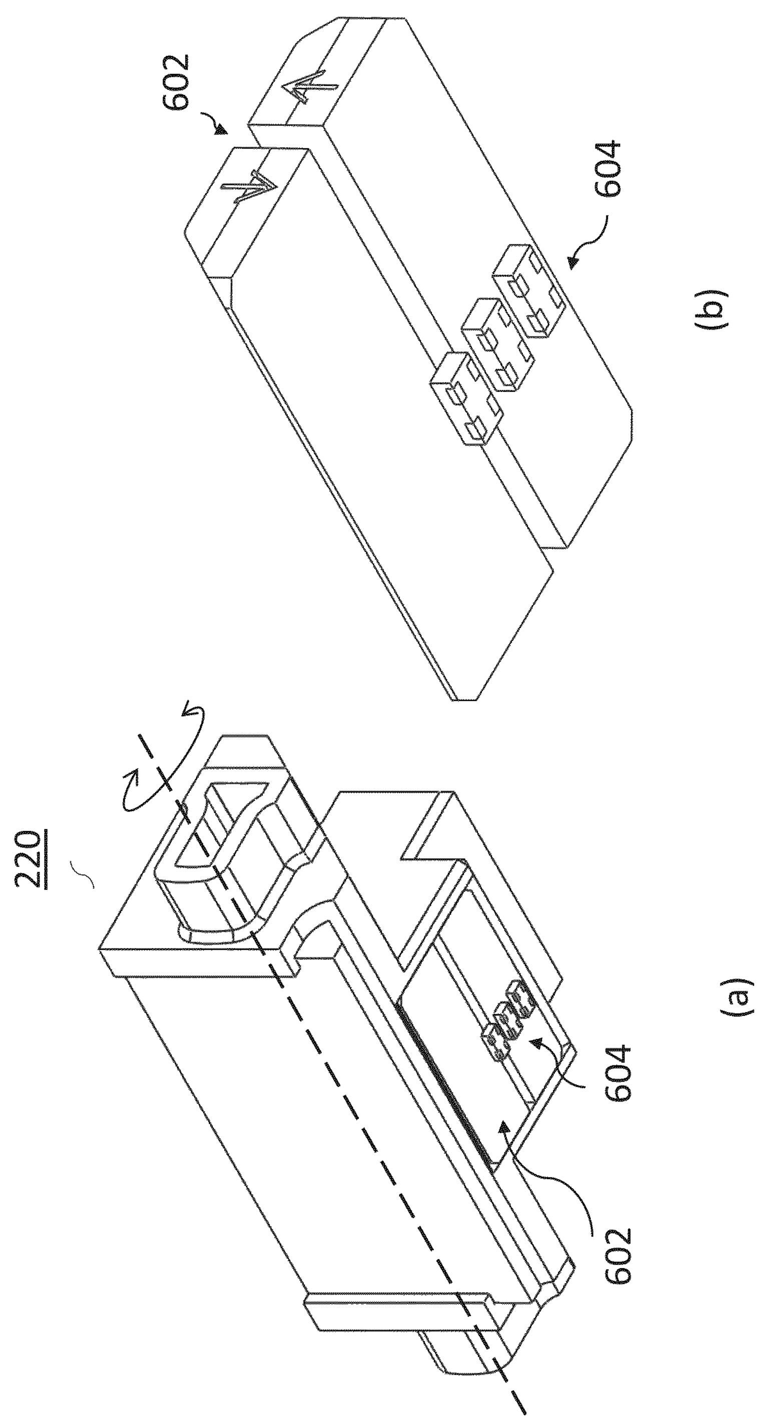
FIG. 6 shows the pitch sub-assembly including an exemplary magnet Hall bar arrangement.

FIG. 6 shows pitch sub-assembly 220 including an exemplary magnet Hall bar arrangement. Pitch driving and sensing magnets 602 are fixedly coupled to pitch sub-assembly 220, and pitch sensing Hall bars 604 are fixedly coupled to yaw sub-assembly 210. In each axis, multiple Hall sensors can be used to allow small rotations per A2D controller (driver) reading from the Hall bars and improve linearity of the sensing. In contrast, in PCT/IB2019/05331, a single Hall bar was used for each axis.

Pitch sub-assembly embodiments disclosed herein may support a pitch rotation range of e.g. ±2 to ±20 degrees.

Figure 7:
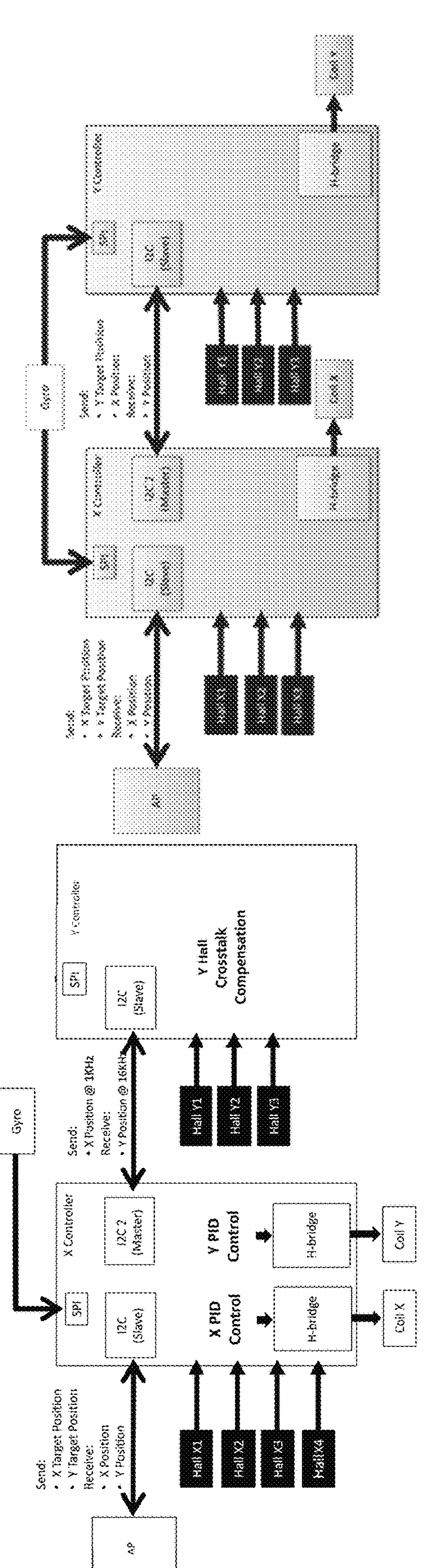
FIG. 7 shows details of two different embodiments using two controller/drivers used to control and drive various functions of the actuator.

FIG. 7 shows details of two different embodiments using two controller/drivers (a X (Yaw) and a Y (Pitch) controller) that receive inputs from e.g. a smartphone application processor (AP) and from an inertial sensor (e.g. a gyro) and provide currents to two coils of a driving mechanism (actuator). The pitch sub-assembly form a master-slave arrangement, wherein the yaw sub-assembly acts as the master and the pitch sub-assembly acts as the slave.

Figure 8:
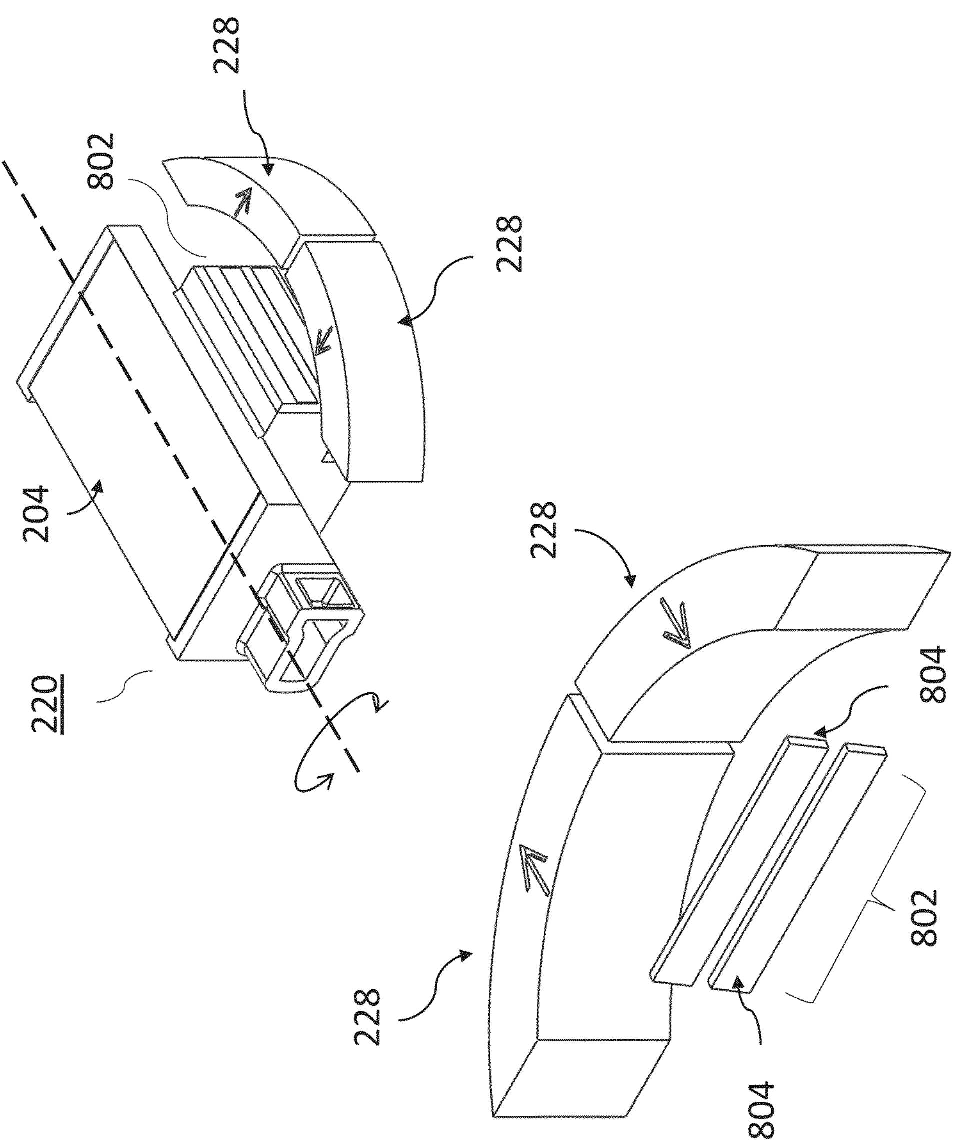
FIG. 8 shows the pitch sub-assembly and the yaw driving magnet.

FIG. 8 shows pitch sub-assembly 220 and yaw driving magnet 228. Yaw driving magnet 228 is also used as a pitch preload magnet. The "preload" is a force directed to attach pitch sub-assembly 220 to pivot rotation mechanism 232. A yoke assembly 802 including two yokes, yoke 804 and yoke 806, is attached to the pitch sub-assembly 220 to minimize a return torque/force and simplify the design. In some embodiments, the distance between yoke 804 and yoke 806 is used to define a return force. In other embodiments, the distance between yoke assembly 802 and yaw driving magnet 228 is used to define the return force. In an alternative embodiment, the pitch preload may use a single yoke.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. An actuator, comprising:

an optical path folding element (OPFE) having a light entering surface and a light exiting surface, wherein the light exiting surface is perpendicular to the light entering surface;

a yaw sub-assembly; and a stationary sub-assembly, wherein the actuator is operative to rotate the OPFE for yaw rotation around a yaw rotation axis formed by yaw rotation axis rails, wherein the yaw rotation axis rails are located at a side of the OPFE that is opposite to the light entering surface of the OPFE, and wherein the yaw rotation of the OPFE is actuated by a single driving coil located at a side of the OPFE that is opposite to the light exiting surface of the OPFE.

2. The actuator of claim 1, further comprising a pitch sub-assembly, wherein the pitch sub-assembly includes a pivot rotation mechanism having a pitch rotation axis, and wherein the actuator is operative to rotate the OPFE for pitch rotation around the pitch rotation axis.

3. The actuator of claim 2, wherein the pivot rotation mechanism includes a pivot ball-guide mechanism formed by a first socket in the pitch sub-assembly that corresponds to a respective second socket in the yaw sub-assembly, with a first ball positioned in the first and the second sockets, and a third socket in the pitch sub-assembly corresponding to a fourth socket in the yaw sub-assembly, with a second ball positioned in the third and the fourth sockets.

4. The actuator of claim 2, wherein the actuator is included in a folded camera.

5. The actuator of claim 2, wherein the yaw sub-assembly and the pitch sub-assembly form a master-slave arrangement, and wherein the yaw sub-assembly acts as the master and the pitch sub-assembly acts as the slave.

6. The actuator of claim 2, wherein the pivot rotation mechanism includes a pitch driving coil and a magnet, wherein the pitch driving coil surrounds the yaw rotation axis, and wherein the pitch rotation is sensed by at least one Hall sensor.

7. The actuator of claim 6, wherein the at least one Hall sensor includes 3 Hall sensors.

8. The actuator of claim 1, wherein the yaw sub-assembly includes at least one groove-ball mechanism.

9. The actuator of claim 8, wherein grooves of the at least one groove-ball mechanism are concentrically curved and have a center of the curvature on the yaw rotation axis.

10. The actuator of claim 8, wherein balls of the at least one groove-ball mechanism are guided by groove pairs that include each a groove on the yaw sub-assembly and a groove on the stationary sub-assembly.

11. The actuator of claim 8, wherein the at least one groove-ball mechanism includes at least 3 balls.

12. The actuator of claim 8, wherein balls of the at least one groove-ball mechanism are located in a plane that is perpendicular to the yaw rotation axis.

13. The actuator of claim 8, wherein the yaw rotation is sensed by at least one Hall sensor located beneath the yaw sub-assembly and fixedly coupled to the stationary sub-assembly.

14. The actuator of claim 13, wherein the yaw rotation is sensed by 4 Hall sensors.

15. The actuator of claim 1, wherein the yaw rotation is by an actuation mechanism including the single driving coil and a yaw driving magnet, and wherein the yaw driving magnet is concentrically curved.

16. The actuator of claim 15, wherein the yaw driving magnet is fixedly coupled to the yaw sub-assembly and the single driving coil is fixedly coupled to the stationary sub-assembly.

17. The actuator of claim 15, wherein the yaw driving magnet has two different magnet polarization directions that are perpendicular to the yaw rotation axis.

18. The actuator of claim 1, wherein the OPFE is a prism.

19. The actuator of claim 1, wherein the actuator is included in a smartphone.

* * * * *